(12) United States Patent  
Mito

(10) Patent No.: US 10,093,188 B2  
(45) Date of Patent: Oct. 9, 2018

(54) POWER CONVERTER

(71) Applicant: TOYOTA JIDOSHA KABUSHIKI KAISHA, Toyota-shi, Aichi (JP)

(72) Inventor: Nobufumi Mito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/660,318

(22) Filed: Jul. 26, 2017

(65) Prior Publication Data

US 2018/0086207 A1 Mar. 29, 2018

(30) Foreign Application Priority Data

Sep. 23, 2016 (JP) .................................. 2016-186079

(51) Int. Cl.
| | |
|---|---|
| H02P 1/00 | (2006.01) |
| H02M 1/00 | (2006.01) |
| B60L 3/04 | (2006.01) |
| H02P 27/06 | (2006.01) |
| H02M 1/32 | (2007.01) |

(52) U.S. Cl.
CPC ................ B60L 3/04 (2013.01); H02P 27/06 (2013.01); H02M 1/32 (2013.01)

(58) Field of Classification Search
None
See application file for complete search history.

(56) References Cited

U.S. PATENT DOCUMENTS

2015/0231972 A1   8/2015  Oi et al.
2016/0248316 A1*  8/2016  Mizuno .................. B60L 3/003

FOREIGN PATENT DOCUMENTS

| JP | 2011-259517 A | 12/2011 |
| JP | 2015-156761 A | 8/2015 |
| JP | 2016-103445 A | 6/2016 |
| JP | 2017-055563 A | 3/2017 |

* cited by examiner

*Primary Examiner* — Bentsu Ro
*Assistant Examiner* — Zemenay Truneh
(74) *Attorney, Agent, or Firm* — Oliff PLC

(57) ABSTRACT

A power converter may include a smoothing capacitor for a high voltage power source; a discharge circuit for the smoothing capacitor, a controller configured to control the discharge circuit by receiving power via a main power line and a backup power line from a sub-power source; a first switch, arranged on the backup power line, and configured to connect the controller to the sub-power source when a controlling voltage, which is higher than a threshold voltage, is applied to an input terminal of the first switch from the controller, and cut off the controller from the sub-power source when the controlling voltage falls; a voltage retaining capacitor connected between the input terminal and a ground; a second switch controlled by the controller, connected between the input terminal and the ground. An external switch is arranged on the main power line. The external switch may be controlled by another device.

1 Claim, 4 Drawing Sheets

POWER CONVERTER

TECHNICAL FIELD

The description herein discloses a power converter configured to convert power of a high voltage power source to power for driving a motor.

DESCRIPTION OF RELATED ART

An electric vehicle is provided with a power converter configured to convert power from a high voltage power source to power for driving a motor. The power converter includes a smoothing capacitor that smoothes current (voltage) supplied from the high voltage power source. An output voltage of the high voltage power source is 100 volts or more, and this voltage is applied to the smoothing capacitor. When the vehicle crashes with an object, it is not preferable for such a smoothing capacitor maintaining a high voltage to be left as it is at an accident site. Thus, the power converter has a discharge circuit that promptly discharges the smoothing capacitor when the vehicle crashes. For example, a power converter provided with a discharge circuit is exemplified for example in Japanese Patent Application Publications Nos. 2011-259517 and 2016-103445. The electric vehicle is provided with a sub-power source, which has an output voltage lower than that of the high voltage power source, for supplying power to electronic devices. A controller inside the power converter operates by receiving power supply from the sub-power source. If the power supply from the sub-power source stops upon the crash, the controller of the power converter may halt, and thus, the discharge circuit may not be activated. Therefore, the power converter of Japanese Patent Application Publications No. 2011-259517 is provided with a backup power source.

Notably, an "electric vehicle" disclosed herein includes a hybrid vehicle provided with both a motor and an engine, as well as an electric vehicle installed with a fuel cell system.

SUMMARY

When a backup power source is provided in a power converter, the power converter becomes large-sized. Thus, a controller and a sub-power source of the power converter may be considered to be connected by a backup power line, additionally to a main power line, so that power supply to the controller can be ensured using the backup power line even in an event where the power supply from the main power line is stopped. Notably, the main power line is a common power line for supplying power to a plurality of other devices and is wired broadly within the vehicle, and as such, it is prone to breakage of connections upon the crash. Further, the main power line is provided with a switch that disconnects the main power line when a main switch of the vehicle is turned off. Since this switch is controlled by another controller, the switch opens when this other controller is damaged in the crash, and the main power line is thereby disconnected.

In a case of connecting the sub-power source and the power converter using the backup power line in addition to the main power line, there may be a problem as follows. During a normal operation, a connection between the controller of the power converter and the sub-power source is disconnected when the main switch (ignition switch) of the vehicle is turned off and therefore the backup power line would also need a switch. This switch should be controlled by the controller of the power converter. This is because in a configuration that controls this switch by a device external to the power converter, the switch cannot be controlled if the external device is damaged. However, if another device connected to the main power line is short circuited in the crash, an output voltage of the sub-power source temporarily drops until when a fuse of this other device is blown out. In such a situation, voltage power supplied to the controller of the power converter drops, and the controller halts momentarily. If the other controller that controls the switch of the main power line is halted, the switch of the main power line is thereby turned off and the main power line can no longer be used. On the other hand, if the controller is halted, the switch of the backup power line is turned off, and the power supply by the backup power line would also be stopped. Even if the output voltage of the sub-power source recovers by the fuse of the other device being blown out, the controller cannot be reactivated when the switch of the backup power line stays off. The technique disclosed herein provides a solution to such a problem.

A power converter disclosed herein comprises a capacitor (voltage retaining capacitor) that retains a state of a switch of a backup power line so that this switch does not turn off even if a controller is temporarily halted. Since an electrically connected state of the backup power line is retained despite the temporal halt of the controller, the controller can be reactivated when a voltage of the sub-power source recovers. Since the reactivation can be performed promptly even if the controller is temporarily halted after the crash, a discharge circuit can be operated.

Based on one aspect of a technique disclosed herein, a power converter may comprise a smoothing capacitor, a discharge circuit, a controller, a first switch, a second switch, and a voltage retaining capacitor. The smoothing capacitor is provided to smooth current supplied from a high voltage power source. The discharge circuit is configured to discharge the smoothing capacitor. The controller is configured to control the discharge circuit by receiving power supplied from a sub-power source which has an output voltage lower than that of the high voltage power source. Specifically, when a signal indicating that a vehicle has crashed (or a discharge instruction) is received from an external device, the controller activates the discharge circuit, and discharges the smoothing capacitor. The controller is connected with the sub-power source by two power lines, namely a main power line and a backup power line. The main power line is a power line for supplying power to a plurality of other devices and has an external switch arranged thereon, and electric connection and disconnection of the external switch is controlled by another device.

The first switch and the second switch are controlled by the controller. The first switch is arranged on the backup power line. The first switch is a normally open type, which is configured to connect the controller to the sub-power source when a controlling voltage, which is higher than a threshold voltage, is applied to a controlling voltage input terminal of the first switch, and is configured to cut off the controller from the sub-power source when the controlling voltage falls below the threshold voltage. The voltage retaining capacitor is connected between the controlling voltage input terminal of the first switch and a ground of the power converter. During the voltage retaining capacitor is being charged, the connection between the controller and the sub-power source by the first switch is retained. The second switch is connected between the controlling voltage input terminal of the first switch and the ground, and is configured to discharge the voltage retaining capacitor when it is closed (electrically connected).

The above power converter has the controller connected to the sub-power source via the main power line and the backup power line, so the controller can receive power supply even when the main power line is disconnected. Further, by being provided with the voltage retaining capacitor, the connection between the sub-power source and the controller can be retained even if the controller temporarily halts by a voltage drop in the backup power line. Due to this, the controller can immediately reactivate when the output voltage of the sub-power source recovers. The second switch is provided so as to disconnect the backup power line during normal operation in response to the main switch (ignition switch) being turned off. Details and further improvements of the technique disclosed herein will be described in the "EMBODIMENT" below.

EMBODIMENT

Figure 1:
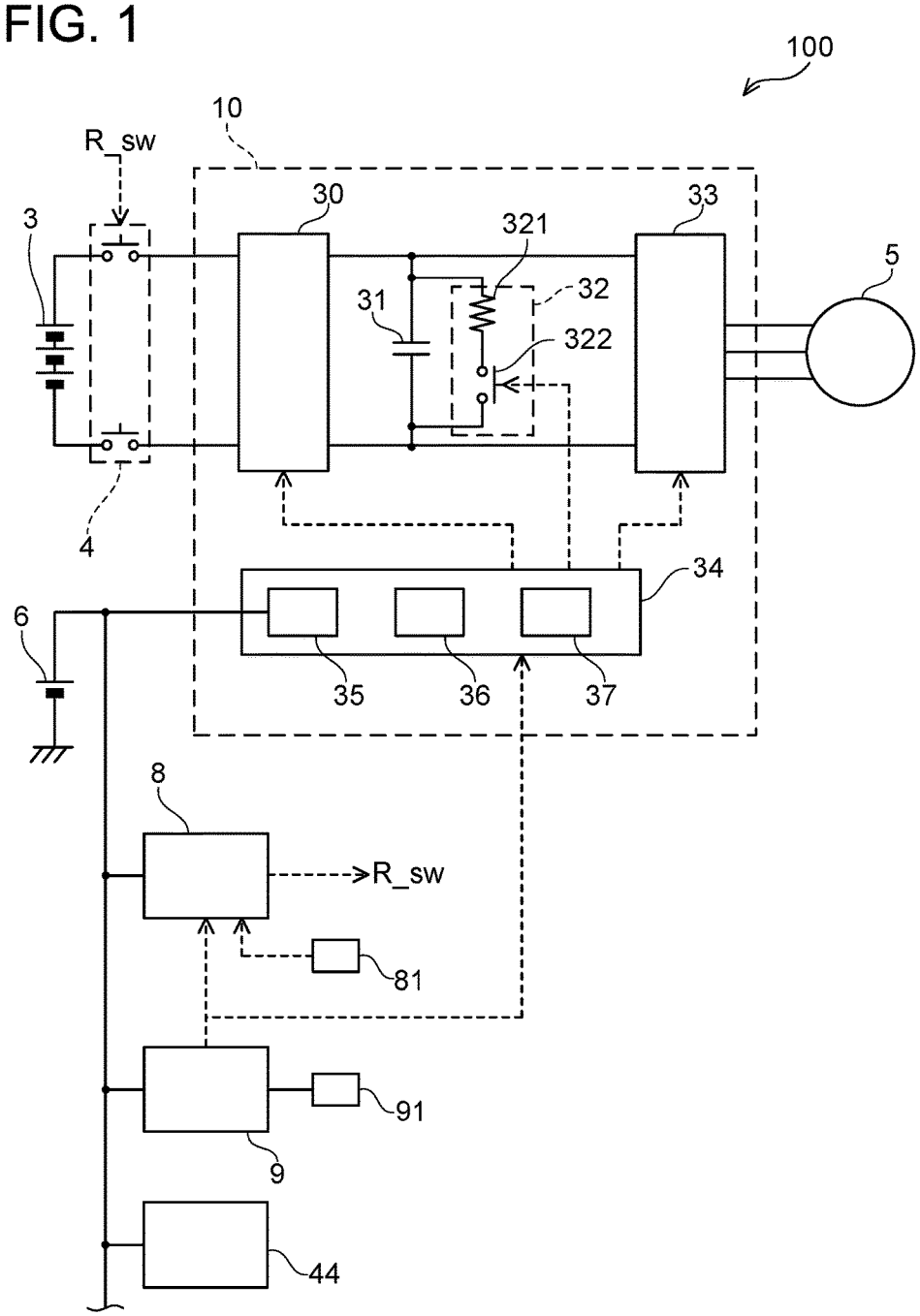
FIG. 1 is a block diagram of a power system of an electric vehicle including a power converter of an embodiment.

A power converter 10 of an embodiment will be described with reference to the drawings. FIG. 1 shows a block diagram of a power system of an electric vehicle 100 including the power converter 10. The electric vehicle 100 runs using a motor 5 for running. The power converter 10 is a device that converts direct current power from a main battery 3 into driving power of the motor 5. The main battery 3 and the power converter 10 are connected via a system main relay 4. The system main relay 4 is controlled by an HV controller 8 that controls the entire vehicle. The HV controller 8 closes the system main relay 4 when a main switch 81 (ignition switch) of the vehicle is turned n. The HV controller 8 opens the system main relay 4 when the main switch 81 is turned off. When the main switch 81 is turned off, the power converter 10 is disconnected from the high-voltage main battery 3. The main battery 3 is for example a lithium ion battery.

The power converter 10 includes a voltage converter 30, an inverter 33, and a motor controller 34. The voltage converter 30 is a so-called buck-boost DC-DC converter, and possesses a step-up function to step up a voltage from the main battery 3 and supply the same to the inverter 33, and a step-down function to step down direct current power sent from the inverter 33 and supply the same to the main battery 3. Notably, the "direct current power sent from the inverter 33" is regenerative power that the motor 5 generates using kinetic energy of the vehicle which is generated when a driver puts a brake pedal on. The regenerative power that the motor 5 generated is converted by the inverter 33 from alternating current power to direct current power, and is sent to the voltage converter 30.

The motor controller 34 controls the voltage converter 30, the inverter 33, and the discharge circuit 32. Under normal operation, the motor controller 34 controls the voltage converter 30 and the inverter 33 by receiving instructions from the HV controller 8, which is its superior controller in charge of the entire vehicle. Specifically, the HV controller 8 determines a target output of the vehicle from an accelerator pedal effort, and sends the target output to the motor controller 34. The motor controller 34 controls the voltage converter 30 and the inverter 33 so that the target output is achieved. The motor controller 34 is configured of a power source circuit 35, a processor 36, a memory 37, and the like. The motor controller 34 operates by receiving power supply from a sub battery 6. The power source circuit 35 is a DC-DC converter that converts a voltage of the sub battery 6 (e.g., 12 volts) to a driving voltage of the processor 36, the memory 37, and the like (e.g., 5 volts). The memory 37 stores programs for controlling the motor 5, and programs for controlling a discharge circuit 32 to be described later. The processor 36 reads out the programs from the memory 37, and controls the motor 5 and the discharge circuit 32 according to the programs.

A smoothing capacitor 31 is arranged between the voltage converter 30 and the inverter 33 in parallel thereto. The smoothing capacitor 31 is provided to suppress pulsation of current (voltage) flowing between the voltage converter 30 and the inverter 33. An output voltage of the main battery 3 is 100 volts or more, and a voltage of 100 volts or more is constantly being applied to the smoothing capacitor 31 during running. Due to this, the power converter 10 is provided with a discharge circuit 32 for discharging the smoothing capacitor 31 at an event where the vehicle crashes with an object. The discharge circuit 32 is a serial connection of a discharging resistance 321 and a switch 322, and this serial connection circuit is connected in parallel to the smoothing capacitor 31. When the vehicle crash is detected by an accelerometer 91, an air bag controller 9 notifies as such to the HV controller 8, and sends a discharge instruction to the motor controller 34 of the power converter 10. The motor controller 34 closes the switch 322 of the discharge circuit 32 in response to the discharge instruction, connects the discharging resistance 321 to the smoothing capacitor 31, and discharges the smoothing capacitor 31.

The motor controller 34 of the power converter 10, the HV controller 8, and the air bag controller 9 operate on the power from the sub battery 6. An output voltage of the sub battery 6 is lower than the output voltage of the main battery 3, and it is for example 12 volts. Numbers of other devices (e.g., lamp 44) are also connected to the sub battery 6. Notably, the power converter 10 and the sub battery 6 are connected by two lines, namely the main power line and the backup power line, however, FIG. 1 simply connects the sub battery 6 and the power converter 10 by one line. Further, a fuse for preventing overcurrent is provided on each of power lines connecting the sub battery 6 to respective load devices, however, those fuses are also omitted from depiction. A connection structure of the sub battery 6 with other devices will be described later with reference to FIG. 2.

As mentioned above, the power converter 10 receives the discharge instruction from the air bag controller 9 when the car crashes, and discharges the smoothing capacitor 31. However, a power line (a main power line 7 to be described later) that supplies the power to numbers of devices from the sub battery 6 is wired broadly within the vehicle, and as such, there is a risk that it might break off at the same time as the car crash. If the power supply from the sub battery 6 to the power converter 10 (motor controller 34) stops, the smoothing capacitor 31 cannot be discharged. Or in another case, if the lamp 44 for example is damaged and short circuited in the car crash, the output voltage of the sub battery 6 drops. Although depiction is omitted in FIG. 1, a fuse is connected to a power line connecting the sub battery 6 and the lamp 44, and the fuse blows off within a short period of time when the lamp 44 is short circuited, as a result of which the power line is disconnected from the lamp 44, and the voltage recovers. However, this temporary drop in the voltage halts the motor controller 34 of the power converter 10, and the smoothing capacitor 31 cannot be discharged unless the motor controller 34 is restarted upon the recovery of the voltage. Thus, the power converter 10 is connected to the sub battery 6 by two lines (the main power line 7 and a backup power line 50 to be described later) so that the power supply from the sub battery 6 will not be stopped at the time of the crash. Next, a power supply route from the sub battery 6 to the power converter 10 (motor controller 34) will be described in detail.

Figure 2:
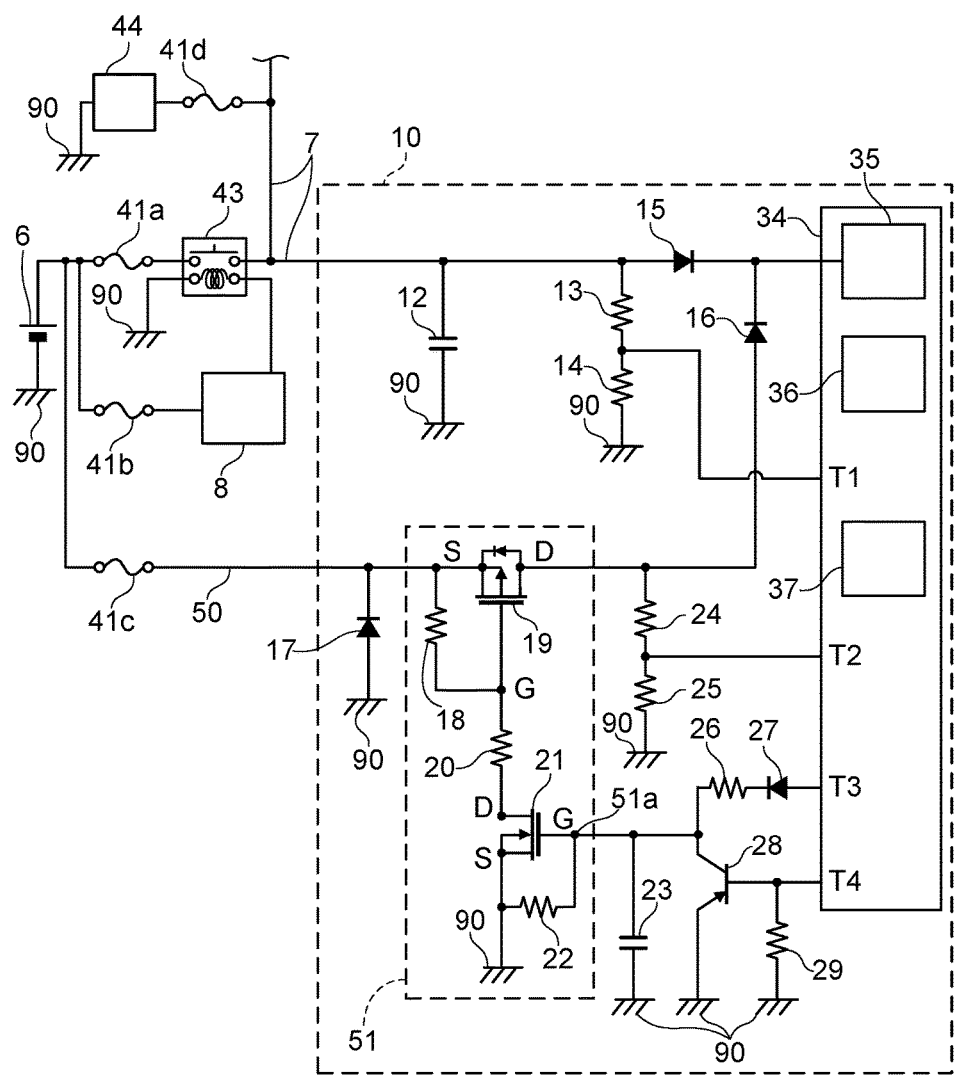
FIG. 2 is a diagram showing a power system of a sub battery and a power supply circuit in the power converter.

FIG. 2 is a block diagram of a power system of the sub battery 6 and a power supply circuit in the power converter 10. In FIG. 2, the voltage converter 30, the inverter 33, the smoothing capacitor 31, and the discharge circuit 32 provided in the power converter 10 are omitted from depiction.

The sub battery 6 and the motor controller 34 of the power converter 10 are connected by two power lines, namely the main power line 7 and the backup power line 50. Notably, the main power line 7 is broadly wired within the vehicle, and numbers of load devices such as the lamp 44 are connected thereto. The backup power line 50 is a dedicated line that connects the sub battery 6 with the motor controller 34 on a one-on-one basis. Further, the HV controller 8 is directly connected to the sub battery 6 by another power line. A fuse 41b is arranged on this other power line. A fuse 41c is also arranged on the backup power line 50.

A fuse 41a and an IGCT relay 43 are arranged on the main power line 7. The fuse 41a has a larger capacity than the other fuses 41b to 41d. The IGCT relay 43 is controlled by the HV controller 8 that controls the overall vehicle. When the main switch 81 (see FIG. 1) of the vehicle is turned on, the HV controller 8 closes the IGCT relay 43 together with the aforementioned system main relay 4. When the IGCT relay 43 is closed, the power from the sub battery 6 flows in the main power line 7. When the IGCT relay 43 is closed, the power is supplied to the motor controller 34 of the power converter 10, the lamp 44, and the like. Notably, although the details will be described later, a backup line switch 51 arranged on the backup power line 50 is also open during the main switch 81 is off and the power converter 10 is thereby disconnected from the sub battery 6.

As shown in FIG. 2, the backup line switch 51 provided on the backup power line 50 is arranged within a housing of the power converter 10. Although the details will be described later, the backup line switch 51 is controlled by the motor controller 34. As mentioned before, the sub battery 6 and the motor controller 34 are connected by two power lines, namely the main power line 7 and the backup power line 50. A switch (the IGCT relay 43) of which electric connection and disconnection are controlled by the HV controller 8, which is an external device of the power converter 10, is arranged on the main power line 7. The backup line switch 51 of which electric connection and disconnection are controlled by the motor controller 34 is arranged on the backup power line 50. The fuse 41c is also arranged on the backup power line 50.

A circuit for the power supply system inside the power converter 10 will be described. The main power line 7 is connected to the power source circuit 35 of the motor controller 34 of the power converter 10. As aforementioned, the power source circuit 35 is a DC-DC converter that converts the voltage of the sub battery 6 to the driving voltage of the processor 36, the memory 37, and the like of the motor controller 34. A diode 15 for inverse flow prevention is provided on the main power line 7. Two resistive elements 13, 14 are serially connected between the main power line 7 and a ground 90. A midpoint between the resistive elements 13, 14 is connected to a T1 terminal of the motor controller 34. That is, the T1 terminal is applied with the voltage of the main power line 7 that is divided by the resistive elements 13, 14. The T1 terminal is a terminal for monitoring whether or not the voltage of the main power line 7 is within a normal range. Further, a capacitor 12 for noise removal is connected between the main power line 7 and the ground 90.

The backup power line 50 will be described. A transistor 19 is arranged on the backup power line 50. The transistor 19 is a p channel type field effect transistor, and current flows from its source S to its drain D when a gate voltage falls below a gate threshold voltage. When the gate voltage exceeds the gate threshold voltage, the current stops flowing from the source S to the drain D. The source S and a gate G of the transistor 19 are connected via a resistive element 18. Further, the gate G is connected to a drain D of a transistor 21 via a resistive element 20. A source S of the transistor 21 is connected to the ground 90. The source and a gate of the transistor 21 are connected via a resistive element 22. The transistor 21 is an n type field effect transistor, and current flows from its drain D to its source S when a gate voltage exceeds a gate threshold voltage. When the gate voltage falls below the gate threshold voltage, the current stops flowing from the drain D to the source S. The gate G of the transistor 21 is connected to a T3 terminal of the motor controller 34 via a resistive element 26 and a diode 27 for inverse flow prevention. The motor controller 34 controls the transistor 21 (and the transistor 19) through the T3 terminal. A capacitor 23 is connected between the gate of the transistor 21 and the ground 90.

Two resistive elements 24, 25 are serially connected between the backup power line 50 and the ground 90, and a midpoint thereof is connected to a T2 terminal of the motor controller 34. The T2 terminal is applied with the voltage of the backup power line 50 that is divided by the resistive elements 24, 25. The T2 terminal is a terminal for monitoring whether or not the voltage of the backup power line 50 is within a normal range. A diode 16 provided on the backup power line 50 is a diode for inverse flow prevention. Further, a diode 17 connected between the backup power line 50 and the ground 90 is a diode for circuit protection.

Operations of the foregoing circuit configurations will be described. At beginning, a voltage of the T3 terminal of the motor controller 34 is set to a LOW level, which is lower than the gate threshold voltage. In this situation, the gate G of the transistor 21 is maintained at a LOW level, and the drain-source connection of the transistor 21 is disconnected. When the transistor 21 is disconnected, the gate G of the transistor 19 is maintained at a potential of the sub battery 6. Since the transistor 19 is a p channel type field effect transistor, its source-drain connection is disconnected when the gate G is at a HIGH level.

When the motor controller 34 raises the voltage of the T3 terminal to a HIGH level which exceeds the gate threshold voltage, the gate G of the transistor 21 shifts to a HIGH level, and the drain-source connection of the transistor 21 becomes electrically connected. In so doing, the gate G of the transistor 19 is electrically connected to the ground 90, and a potential thereof drops to a ground level (i.e., the LOW level that is lower than the gate threshold voltage). When the gate G drops to the LOW level, the source-drain connection of the transistor 19 becomes electrically connected. That is, the sub battery 6 and the motor controller 34 are electrically connected. The motor controller 34 can receive the power supply from the sub battery 6 through the backup power line 50 as well.

A circuit shown by a broken line 51 of FIG. 2 configures one switch. This switch will be termed the "backup line switch 51". An operation of the backup line switch 51 may be summarized as follows. The backup line switch 51 switches the electric connection and disconnection of the backup power line 50. The gate G of the transistor 21 corresponds to the controlling voltage input terminal 51a of the backup line switch 51. The motor controller 34 controls the voltage to be applied to the controlling voltage input terminal 51a of the backup line switch 51 through the T3 terminal. When the controlling voltage exceeding the gate threshold voltage is applied from the motor controller 34 to the controlling voltage input terminal 51a, the backup line switch 51 connects the motor controller 34 to the sub battery 6. When the controlling voltage falls below the gate threshold voltage, the backup line switch 51 cuts the motor controller 34 off from the sub battery 6. The backup line switch 51 is a so-called normally open type.

The capacitor 23 is connected between the controlling voltage input terminal 51a of the backup line switch 51 (gate G of the transistor 21) and the ground 90. This capacitor 23 maintains the voltage of the gate G at the HIGH level even when the voltage level of the T3 terminal has once become HIGH level and thereafter dropped to the LOW level. Notably, since the diode 27 for inverse flow prevention is connected between the controlling voltage input terminal 51a and the T3 terminal, no current flows from the controlling voltage input terminal 51a toward the T3 terminal.

A T4 terminal of the motor controller 34 is connected to the controlling voltage input terminal 51a of the backup line switch 51 via a transistor 28. When the motor controller 34 rises a voltage level of the T4 terminal to a HIGH level, a collector-emitter connection of the transistor 28 becomes electrically connected. As a result, the controlling voltage input terminal 51a of the backup line switch 51 is electrically connected to the ground 90, and the capacitor 23 is thereby discharged. When the capacitor 23 is discharged, the voltage of the controlling voltage input terminal 51a of the backup line switch 51 falls below the gate threshold voltage, the backup line switch 51 opens, and the backup power line 50 becomes disconnected. The transistor 28 corresponds to a switch for opening the backup line switch 51 by discharging the capacitor 23. A resistive element 29 connected between a gate of the transistor 28 and the ground 90 is for noise prevention.

Advantages of the circuit of the power supply system of FIG. 2 will be described. The motor controller 34 is connected to the sub battery 6 with two power lines, namely the main power line 7 and the backup power line 50. For example, when the vehicle crashes, and the HV controller 8 is damaged and failed, the IGCT relay 43 is opened, and the main power line 7 is thereby disconnected. There also is a risk that the main power line 7 that is wired broadly within the vehicle breaks by an impact of the crash. There is a possibility that the power supply from the main power line 7 to the power converter 10 stops due to the impact of the crash.

Even if the main power line 7 is disconnected, the sub battery 6 and the motor controller 34 are connected by the backup power line 50. However, if other load devices (e.g., the lamp 44), which are connected to the sub battery 6, are short circuited, the voltage of the backup power line 50 (i.e., the output voltage of the sub battery 6) drops. When the lamp 44 is short circuited and overcurrent flows, the fuse 41d is blown out and the lamp 44 is thereby cut off from the sub battery 6. When the short-circuited lamp 44 is cut off from the sub battery 6, the output voltage of the sub battery 6 thereby recovers, so the power supply to the motor controller 34 also recovers. However, if the power supply to the motor controller 34 drops even temporarily, the motor controller 34 may halt, and the voltage of the T3 terminal drops. When the voltage of the T3 terminal drops and the voltage (controlling voltage) of the controlling voltage input terminal 51a of the backup line switch 51 falls below the gate threshold, the backup line switch 51 opens, and the connection between the sub battery 6 and the motor controller 34 is disconnected. When this happens, the power is not supplied to the motor controller 34 even when the output voltage of the sub batter 6 recovers, and thus the motor controller 34 cannot reactivate.

However, the power converter 10 is provided with the voltage retaining capacitor (capacitor 23) configured to retain the voltage of the controlling voltage input terminal 51a of the backup line switch 51. Due to having the voltage retaining capacitor (capacitor 23), the backup line switch 51 maintains the electrically connected state even if the motor controller 34 temporarily halts. Due to this, the power supply through the backup power line 50 is not discontinued. Thus, the motor controller 34 can recover immediately from its temporal halt even if the power supply by the main power line 7 stops and the output voltage of the sub battery 6 temporarily drops.

Sequences of activation and halt of the motor controller 34 will be described with reference to FIG. 3. Notably, sequences up to when the motor controller reactivates after the motor controller has halted temporarily upon a crash will be described later with reference to FIG. 4.

Figure 3:
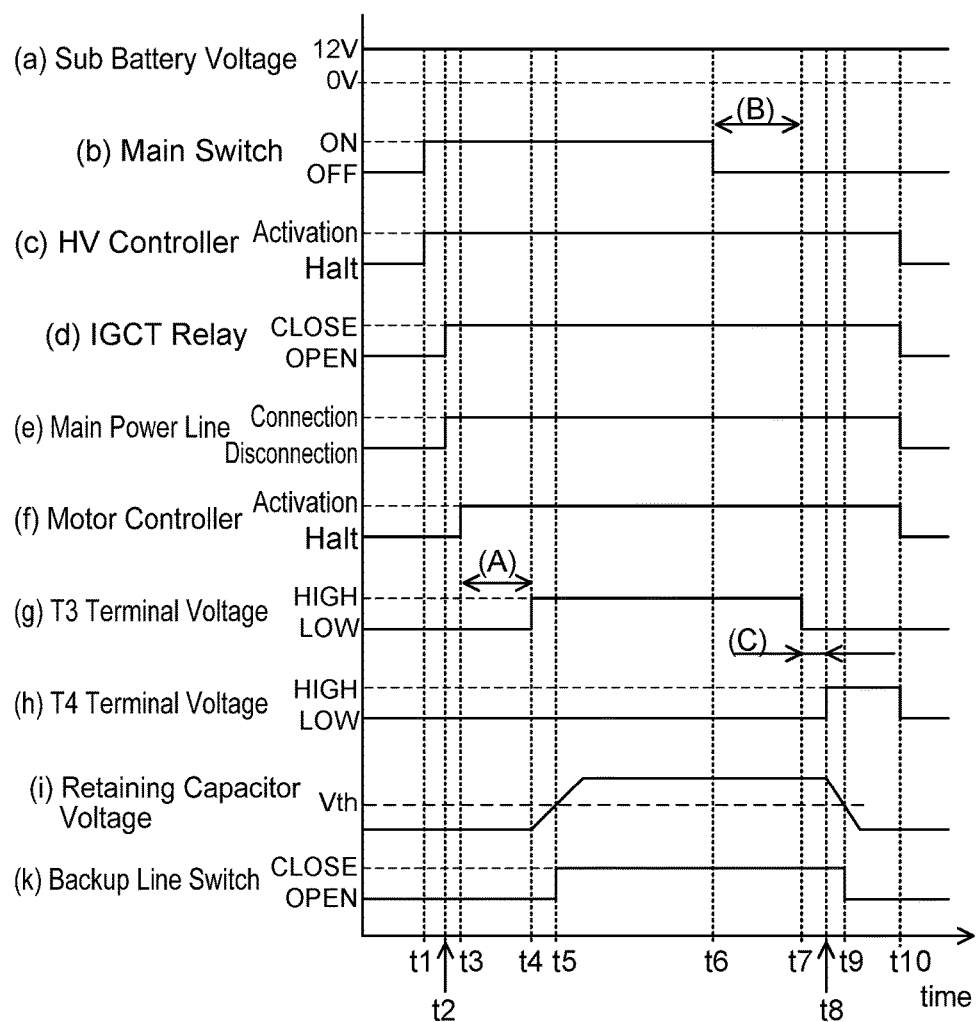
FIG. 3 is a time chart showing sequences of activation and halt of a motor controller under normal operation.

Under normal operation, the voltage of the sub battery 6 is constantly 12 volts ((a) in FIG. 3). At time t1, the driver turns on the main switch 81 of the vehicle (b). In cooperation with the main switch, the HV controller 8 is activated (c). At time t2, the HV controller 8 closes the IGCT relay 43, and the main power line 7 becomes electrically connected (d, e). Since the main power line 7 becomes electrically connected and the power is supplied to the motor controller 34 through the main power line 7, the motor controller 34 is activated at time t3 (f). After the activation, the motor controller 34 performs failure check of the backup line switch 51 and the like, and changes the voltage of the T3 terminal to the HIGH level at time t4 (g). Changing the voltage of the T3 terminal to the HIGH level corresponds to outputting an instruction to close the backup line switch 51. A period (A) in FIG. 3 is a standby time for ensuring time required for initialization of the motor controller 34.

Since the voltage of the T3 terminal shifts from the LOW level to the HIGH level at time t4, the voltage of the voltage retaining capacitor (capacitor 23) rises. At time t5, the voltage of the voltage retaining capacitor (capacitor 23) exceeds the threshold voltage Vth of the backup line switch 51 (the gate threshold voltage of the transistor 21), and thus the backup line switch 51 closes. When the backup line switch 51 closes, the power supply from the sub battery 6 to the motor controller 34 through the backup power line 50 starts. At time t5 and thereafter, the power is supplied to the motor controller 34 from the sub battery 6 through both the main power line 7 and the backup power line 50.

Time t6 and thereafter show halting sequences of the motor controller 34. At time t6, the driver turns off the main switch 81 (see FIG. 1). After time t6, the motor controller 34 changes the voltage of the T3 terminal from HIGH to LOW at time t7, and then changes the voltage of the T4 terminal from LOW to HIGH at time t8. A period of (B) in FIG. 3 is a standby time for ensuring time for performing terminating processes with other devices. A period (C) in FIG. 3 is a delay time for ensuring that the T3 terminal and the T4 terminal do not short circuit.

When the voltage of the T3 terminal changes to the LOW level and the voltage of the T4 terminal changes to the HIGH level, the transistor 28 turns on, and the discharge of the voltage retaining capacitor (capacitor 23) is thereby started. The voltage of the voltage retaining capacitor (capacitor 23) gradually drops, becomes below the threshold voltage Vth at time t9, and the backup line switch 51 thereby opens. The backup line switch 51 opens at time t9, and the backup power line 50 is thereby disconnected. At this timing, the motor controller 34 is still receiving the power supply from the sub battery 6 through the main power line 7. At time t10, the HV controller 8 opens the IGCT relay 43 and halts its operation. Since the IGCT relay 43 opens, the main power line 7 is disconnected, and the motor controller 34 is thereby halted.

Next, sequences of the temporal halt and reactivation of the motor controller 34 upon a crash will be described with reference to FIG. 4. Sequences from time t1 to time t5 are the same as those of FIG. 3. Suppose that the vehicle crashed at time t11. Due to the impact of the crash, the HV controller 8 is damaged, and the IGCT relay 43 thereby opens (FIG. 4, (c), (d)). Since the IGCT relay 43 opens, the main power line 7 is disconnected (e). Concurrently, a short circuit occurs in the HV controller 8, and the output voltage of the sub battery 6 drops (a). Since the output voltage of the sub battery 6 drops, the motor controller 34 also halts at time t1 (f). Since the motor controller 34 halts, the voltage of the T3 terminal drops to the LOW level (g).

The fuse 41a between the HV controller 8 and the sub battery 6 melts out at time t12, and the short-circuited HV controller 8 is out off from the sub battery 6. As a result, the voltage of the sub battery 6 recovers at time t12 (a). Since the voltage of the sub battery 6 drops at time t11, the motor controller 34 halts, and the voltage of the T3 terminal also drops to the LOW level (g). However, due to charges in the voltage retaining capacitor (capacitor 23) connected to the controlling voltage input terminal 51a of the backup line switch 51, the voltage of the controlling voltage input terminal 51a maintains the state of exceeding the threshold voltage Vth (i). A graph (i) in FIG. 4 is the voltage of the voltage retaining capacitor, however, this is equal to the voltage of the controlling voltage input terminal 51a of the backup line switch 51. The charges of the voltage retaining capacitor allows the voltage of the controlling voltage input terminal 51a (the voltage of the voltage retaining capacitor) to maintain the state of exceeding the threshold voltage Vth until time t13. That is, the backup line switch 51 maintains the state of being closed at least until time t13. As aforementioned, the voltage of the sub battery 6 recovers at time t12. At time t12, since the backup line switch 51 is kept closed, the power of the sub battery 6 is supplied to the motor controller 34 through the backup power line 50 at time t12 and thereafter. The motor controller 34 is reactivated at time t12. After the motor controller 34 has reactivated, and after the delay time for the reactivation has passed, the motor controller 34 changes the voltage of the T3 terminal from the LOW level to the HIGH level at time t13. From time t13 and thereafter, the power is supplied from the T3 terminal to the controlling voltage input terminal 51a (i.e., the voltage retaining capacitor), and the voltage of the voltage retaining capacitor is maintained at the HIGH level. Notably, the motor controller 34 reactivates at time t12 and raises the voltage of the T3 terminal to HIGH at time t13. A period (D) from time t12 to time t13 is a period required for initialization process accompanying the reactivation.

Figure 4:
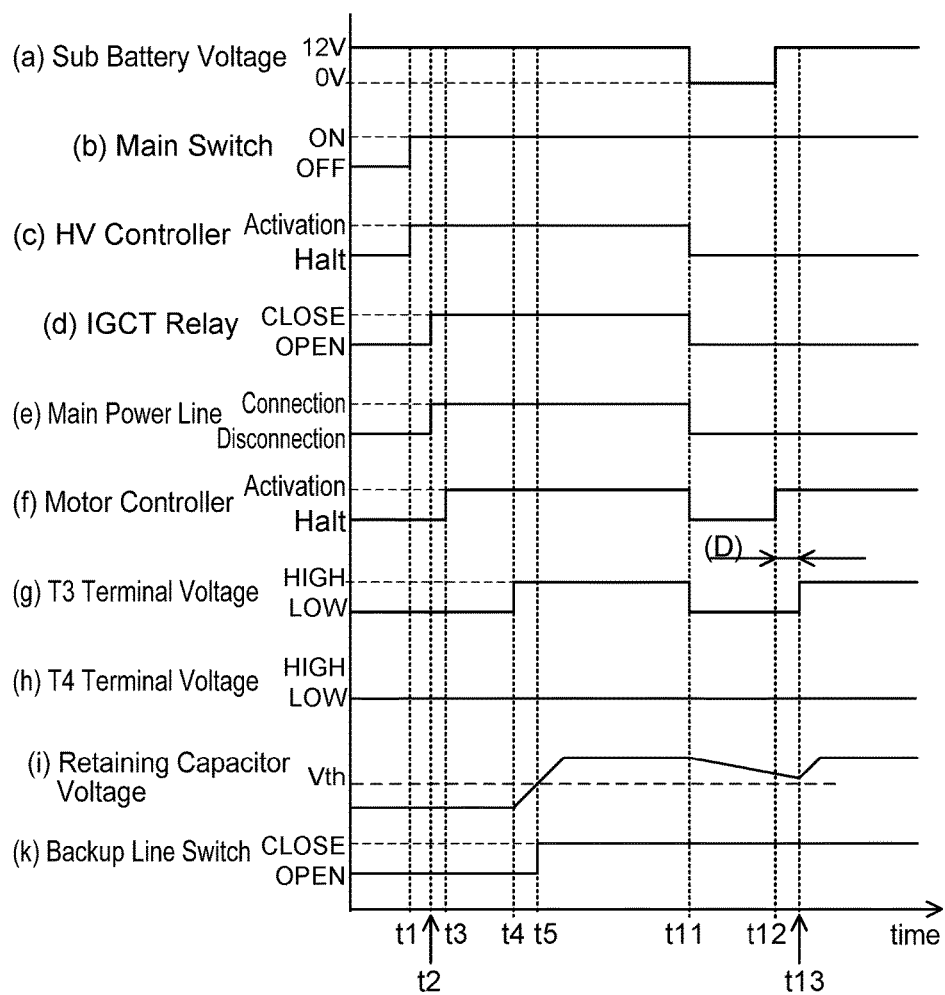
FIG. 4 is a time chart showing sequences up to when the motor controller reactivates after the motor controller has halted due to a temporal drop of an output voltage of the sub battery having occurred in a crash.

As shown in FIG. 4, even when the voltage of the sub battery 6 temporarily drops upon the crash, the state in which the backup line switch 51 is closed (i.e., the state in which the sub battery 6 and the motor controller 34 are connected) is maintained due to the voltage retaining capacitor (capacitor 23) connected to the controlling voltage input terminal 51a of the backup line switch 51. Due to this, the motor controller 34 reactivates immediately when the voltage of the sub battery 6 recovers. After having been reactivated, the motor controller 34 drives the discharge circuit 32, and discharges the smoothing capacitor 31.

In the power converter 10 of the embodiment, even if the motor controller 34 halts by the temporal drop in the voltage of the sub battery 6 upon the crash, the motor controller 34 reactivates together with the recovery of the voltage of the sub battery 6, and thus it can discharge the smoothing capacitor 31.

Some features related to the technique described in the embodiment will be described. The main power line 7 is wired broadly within the vehicle, and numbers of other load devices are connected thereto. On the other hand, the backup power line 50 is a dedicated line that connects the sub battery 6 and the power converter 10 (motor controller 34) on the one-on-one basis. Due to this, the backup power line 50 is less likely to be disconnected upon the crash. The power converter 10 of the embodiment is provided with the discharge circuit 32 which is a serial connection of the discharging resistance 321 and the switch 322. The power converter 10 may utilize the motor 5, the inverter 33, and the voltage converter 30 as a discharge circuit.

The main battery 3 of the embodiment corresponds to an example of a "high voltage source". The high voltage source may be a fuel cell. The sub battery 6 of the embodiment corresponds to an example of a "sub-power source". The motor controller 34 of the embodiment corresponds to an example of a "controller". The backup line switch 51 corresponds to an example of a "first switch". The first switch simply needs to be a normally open type, and is not limited to a structure of the backup line switch 51 in the embodiment. The transistor 28 of the embodiment corresponds to an example of a "second switch". The second switch is a switch configured to connect or separate a high potential side of the capacitor 23 and the ground, and is not limited to a transistor. The capacitor 23 of the embodiment corresponds to an example of a "voltage retaining capacitor". The IGCT relay 43 of the embodiment corresponds to an example of an "external switch". An "external switch" may be located outside the housing of the power converter 10. Alternatively, an "external switch" may be located inside the housing of the power converter 10. The HV controller 8 of the embodiment corresponds to an example of "another device".

The technique disclosed herein may suitably be applied to a hybrid vehicle, or a fuel cell vehicle.

Specific examples of the present invention has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A power converter configured to convert power of a high voltage power source to power for driving a motor, the power converter comprising:
    a smoothing capacitor configured to smooth current provided from the high voltage power source;
    a discharge circuit configured to discharge the smoothing capacitor;
    a controller configured to control the discharge circuit by receiving power via a main power line and a backup power line, from a sub-power source which has an output voltage lower than that of the high voltage power source;
    a first switch of a normally open type, arranged on the backup power line, and configured to connect the controller to the sub-power source when a controlling voltage, which is higher than a threshold voltage, is applied to a controlling voltage input terminal of the first switch from the controller, and cut off the controller from the sub-power source when the controlling voltage falls below the threshold voltage;
    a voltage retaining capacitor connected between the controlling voltage input terminal and a ground of the power converter; and
    a second switch which is controlled by the controller, connected between the controlling voltage input terminal and the ground, and configured to discharge the voltage retaining capacitor;
    wherein an external switch is arranged on the main power line, electric connection and disconnection of the external switch are controlled by another device.

* * * * *